(12) United States Patent
Hershey et al.

(10) Patent No.: US 9,513,833 B2
(45) Date of Patent: Dec. 6, 2016

(54) ASYNCHRONOUS PROCESSING OF MAPPING INFORMATION

(71) Applicant: Amazon Technologies, Inc., Reno, NV (US)

(72) Inventors: Steven Michael Hershey, Seattle, WA (US); Seth William Markle, Seattle, WA (US); Anup Talwalkar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/494,360

(22) Filed: Sep. 23, 2014

(65) Prior Publication Data

US 2016/0085473 A1 Mar. 24, 2016

(51) Int. Cl.
*G06F 12/00* (2006.01)
*G06F 13/00* (2006.01)
*G06F 3/06* (2006.01)

(52) U.S. Cl.
CPC ........... *G06F 3/0638* (2013.01); *G06F 3/0604* (2013.01); *G06F 3/067* (2013.01)

(58) Field of Classification Search
None
See application file for complete search history.

(56) References Cited

U.S. PATENT DOCUMENTS

| 2014/0047040 | A1  | 2/2014 | Patiejunas et al. |
| 2015/0032935 | A1* | 1/2015 | Adams ............... G06F 12/1063 711/6 |
| 2015/0242307 | A1* | 8/2015 | Busaba .............. G06F 9/528 711/165 |

OTHER PUBLICATIONS

PCT Search Report and Written Opinion mailed May 11, 2016 for PCT application No. PCT/US2015/051249, 14 pages.

* cited by examiner

*Primary Examiner* — Sean D Rossiter
(74) *Attorney, Agent, or Firm* — Lee & Hayes, PLLC

(57) ABSTRACT

Functionality is disclosed herein for providing an asynchronous processing service for processing storage mapping information. The asynchronous processing service is configured to receive a storage request including identification of a storage object and a description of a storage operation, perform the storage operation for the storage object in response to receiving the storage request, and asynchronously update mapping information for the performed storage operation.

20 Claims, 9 Drawing Sheets

ASYNCHRONOUS PROCESSING OF MAPPING INFORMATION

BACKGROUND

Online and other remote data storage solutions generally include remote storage systems where customers submit requests to remotely store data. The remote storage systems may include mapping information that records a physical location of portions of data that a particular customer has stored through the remote storage system. It follows therefore that as large amounts of data are stored, the amount of mapping information is increased to account for the increase in stored information.

However, while the remote storage systems may be able to process and store a large amount of data relatively quickly, the mapping information may be processed more slowly depending upon available resources for calculation and updating of physical locations where data is stored. Furthermore, as the volume of storage requests for any particular customer increases as a measure of transactions-per-second (TPS), if available resources for processing mapping information are not scaled to handle the higher TPS, the storage requests may be denied, trigger data handling errors, or may be throttled to allow for mapping information to be successfully processed on the fly. It may, however, be difficult to scale the computing resources for processing mapping information to handle high TPS bursts of storage requests.

The disclosure made herein is presented with respect to these and other considerations.

DETAILED DESCRIPTION

Figure 1:
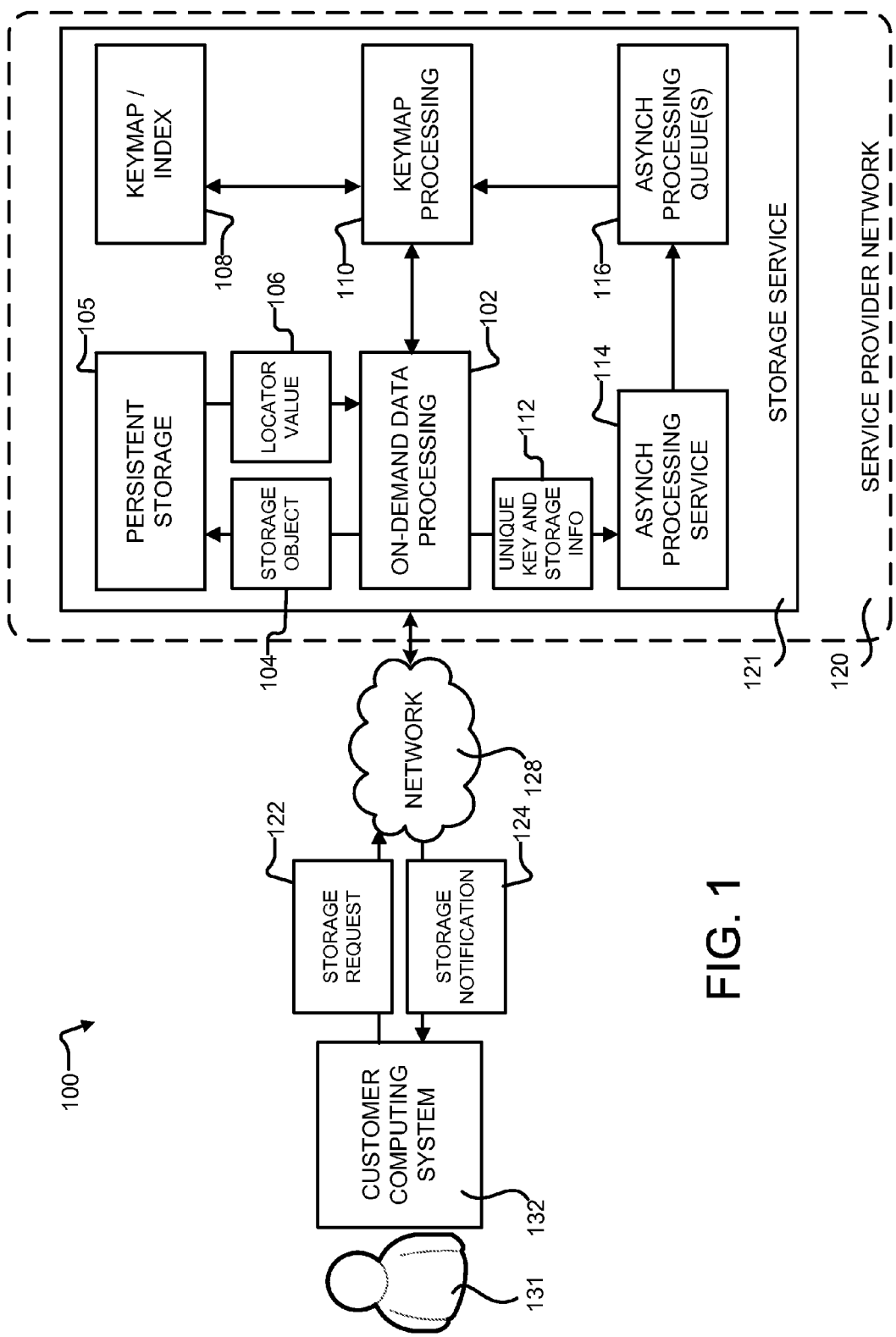
FIG. 1 is a software architecture diagram showing aspects of an illustrative computing system for asynchronously processing mapping information, including several software and hardware components disclosed herein.

The following detailed description is directed to technologies for providing an asynchronous processing service. Utilizing the technologies described herein, an asynchronous processing service can be implemented that provides functionality for queuing and processing unique storage keys for use in asynchronously updating a related keymap. As many storage requests are received, processed, and associated storage objects are stored, physical location information may be processed asynchronously as related to the actual storage of the storage objects. In this manner, storage objects can be physically stored quickly while the processing of mapping information may be completed at a later time. Through the utilization of such an asynchronous processing service, a remote storage system or distributed computing system can handle a relatively large number of TPS while not necessarily having to scale up computing resources for processing mapping information on the fly.

According to one configuration presented herein, an asynchronous processing service is provided that operates within or in conjunction with a service provider network. The asynchronous processing service is a network service that provides functionality for building an asynchronous processing queue, or queues, that durably stores unique keys and storage information to be processed asynchronously. The asynchronous processing queue, or queues, can be managed by the asynchronous processing service.

As will be described in greater detail below, the asynchronous processing service also provides functionality for dequeuing the unique keys subsequent to, and independent from, successful completion of a storage operation for an associated storage object. The asynchronous processing service also provides functionality for determining if some storage requests can be processed in an asynchronous manner if resources are available to process mapping information, to further delay processing of mapping information if storage requests include header information indicating asynchronous priority information, and to provide other related functionality. Additional details regarding the various components and processes described above for implementing an asynchronous processing service for mapping information will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a software architecture diagram showing aspects of an illustrative computing system 100, including several software and hardware components disclosed herein for asynchronously processing mapping information. The system 100 may include a service provider network 120 configured to provide a plurality of network services, which is described more fully below with reference to FIGS. 5-8. As shown in FIG. 1, the system 100 may also include storage service 121 deployed from within the service provider network 120. The storage service 121 may include a plurality of separate software components and/or services that are described below in greater detail.

The system 100 may also include an on-demand data processing component 102 configured to process data storage requests 122 received from a customer 131 and/or a customer computing system 132 in a synchronous manner, while updating associated mapping information in an asynchronous manner. The on-demand data processing component 102 can be implemented as a network service in one configuration. As described in greater detail below, the on-demand data processing component 102 requests storage operations such as get, copy, delete, and/or put, and submits storage objects 104 retrieved from the storage requests 122 for storage in persistent storage 105.

The on-demand data processing component 102 may be a collection of computing resources configured to synchronously process requests to store and/or access data. The on-demand data processing component 102 may operate using computing resources (e.g., databases) that enable the on-demand data processing component 102 to locate and retrieve data quickly, so as to allow data to be provided in responses to requests for the data. For example, the on-demand data processing component 102 may maintain stored data in a manner such that, when a request for a data object is retrieved, the data object can be provided (or streaming of the data object can be initiated) in a response to the request. As described more fully below, data stored by the on-demand data processing component 102 may be organized into storage objects 104. The storage objects 104 may have arbitrary sizes except, perhaps, for certain constraints on size. Thus, the on-demand data processing component 102 may store numerous storage objects 104 of varying sizes.

The customer 131 can be a user or entity that subscribes to or utilizes the service provider network 120. The customer computing system 132 can include any suitable host computer apparatus configured to communicate with the service provider network 120, for example, over a suitable data communications network 128. One particular non-limiting example of a suitable computer apparatus is described more fully below with reference to FIG. 8.

Persistent storage 105 can include any suitable storage, including, but not limited to, physical media configured to receive and store storage object 104 and to return an associated locator value 106, or other unique identification information. According to one implementation, the persistent storage 105 may include a network-based bucket-based storage model where locator values 106 for various storage objects 104 may be grouped into "buckets" for administrative, security or other purposes. The bucket-based storage model may be organized based on a customer identification of the customer 131, the locator value 106, an associated bucket identification, and/or any other suitable information.

In some configurations, the persistent storage 105 may determine the locator value 106, store the storage object 104, and transmit the locator value 106 to the on-demand data processing component 102. The locator value 106 determined by the persistent storage 105 is unique to the storage object 104. The locator value includes data that describes a location of an associated storage object 104 in persistent storage 105, and related data or metadata. For example, the locator value 106 can include an offset or other location value.

The on-demand data storage component 102 can provide the locator value 106 and any related storage information (e.g., a description of a storage operation and/or bucket) related to the storage object 104 (e.g., as unique key and storage information 112) to a keymap processing component 110. The keymap processing component 110 is a software component configured to utilize resources of the service provider network 120 to process a locator value 106 to create, update, or otherwise modify a keymap/index 108 of mapping information. For example, according to one configuration, the keymap processing component 110 is configured to update the keymap/index 108 according to the locator value 106, and any associated storage information, upon receipt of the locator value 106.

The keymap/index 108 may be a database, a dynamic data structure, or another type of data structure configured to store a respective keymap entry for each storage object 104 stored in persistent storage 105. For a given storage object 104, the respective keymap entry includes the locator value 106 and a unique key provided by the customer 131 corresponding to the stored storage object 104. Furthermore, according to one configuration, the keymap/index 108 is a sorted index that is sorted based upon an underlying bucket-based organization of storage objects. Updating of the keymap/index 108 may include determining where to include the locator value 106 and associated unique key based on the particular sorting of the keymap/index 108 after storing a new storage object 104. Updating of the keymap/index 108 can also include re-sorting as necessary when performing a copy storage operation. Updating of the keymap/index 108 can also include removal of a locator value 106 and the associated unique key when performing a delete storage operation. Additionally, updating of the keymap/index 108 can include any other suitable operations, depending upon the nature of a particular storage request 122 (e.g., get request, copy request, put request, delete request, and others).

As further shown in FIG. 1, an asynchronous processing service 114 is in operative communication with the on-demand data processing component 102. According to one configuration, the asynchronous processing service 114 is configured to receive the unique key and storage information 112 from the on-demand data processing component 102, instead of the keymap processing component 110. For example, the on-demand data processing component 102 may determine that the keymap/index 108 should be updated or modified in an asynchronous manner. In this case, rather than the keymap processing component 110 receiving the unique key and storage information 112 for processing concurrently with the storage requests 122, the asynchronous processing service queues the unique key and storage information 112 in one or more asynchronous processing queues 116. The unique key and storage information 112 received in the asynchronous processing queue 116 includes, for example, the unique key provided by the customer 131, and information describing a storage operation requested through storage request 122 and associated locator value 104. Other storage information may also be included, and, according to one configuration, should include at least that information necessary to appropriately update the keymap/index 108.

The asynchronous processing queues 116 are durable data structures that are configured to receive and queue the unique key and storage information 112 for asynchronous processing by the keymap processing component 116. As used herein, the term "durable" as related to a data structure refers to a data structure with a relatively low probability of being lost or irretrievable. According to one configuration, a durable data structure has a probability of less than a first threshold of being lost or irretrievable. According to other configurations, a durable data structure, at least, includes erasure code to ensure recoverability of information, is archived to ensure recoverability of information, and/or is replicated at one or more storage locations to ensure recoverability of information. Other implementations of durability may also be applicable, depending upon the particular implementation of the asynchronous processing queues 116.

The asynchronous processing queues 116 may be organized as first-in-first-out (FIFO) queues. The asynchronous processing service 114 can direct the asynchronous processing queues 116 to transmit the unique key and storage information 112 to the keymap processing component 110 independent of the processing of storage requests 122 by the on-demand data processing component 102. Thereafter, the keymap processing component 110 can process the unique key and storage information 112 in the manner described above, while being asynchronous as compared to the storage of storage objects 104 in persistent storage 105. Upon successful updating of the keymap/index 108, a storage notification 124 can then be transmitted to the customer 131 or customer computing system 132. The storage notification 124 can include an indication that the storage request 122 was successfully completed and any other suitable or desirable information. The storage notification 124 is not transmitted to the customer computing system 132 until both the storage operation (i.e. creation, deletion, copying) on a storage object 104 has been completed and the keymap/index 108 has been updated accordingly.

As described above, the asynchronous processing service 114 utilizes one or more durable queues 116 for handling processing of mapping information to be stored as keymap/index 108. Further details regarding the operation of the storage service 121, asynchronous processing service 114, on-demand data processing component 102, and keymap processing component 110 are provided below with reference to FIGS. 2-4.

Figure 2A:
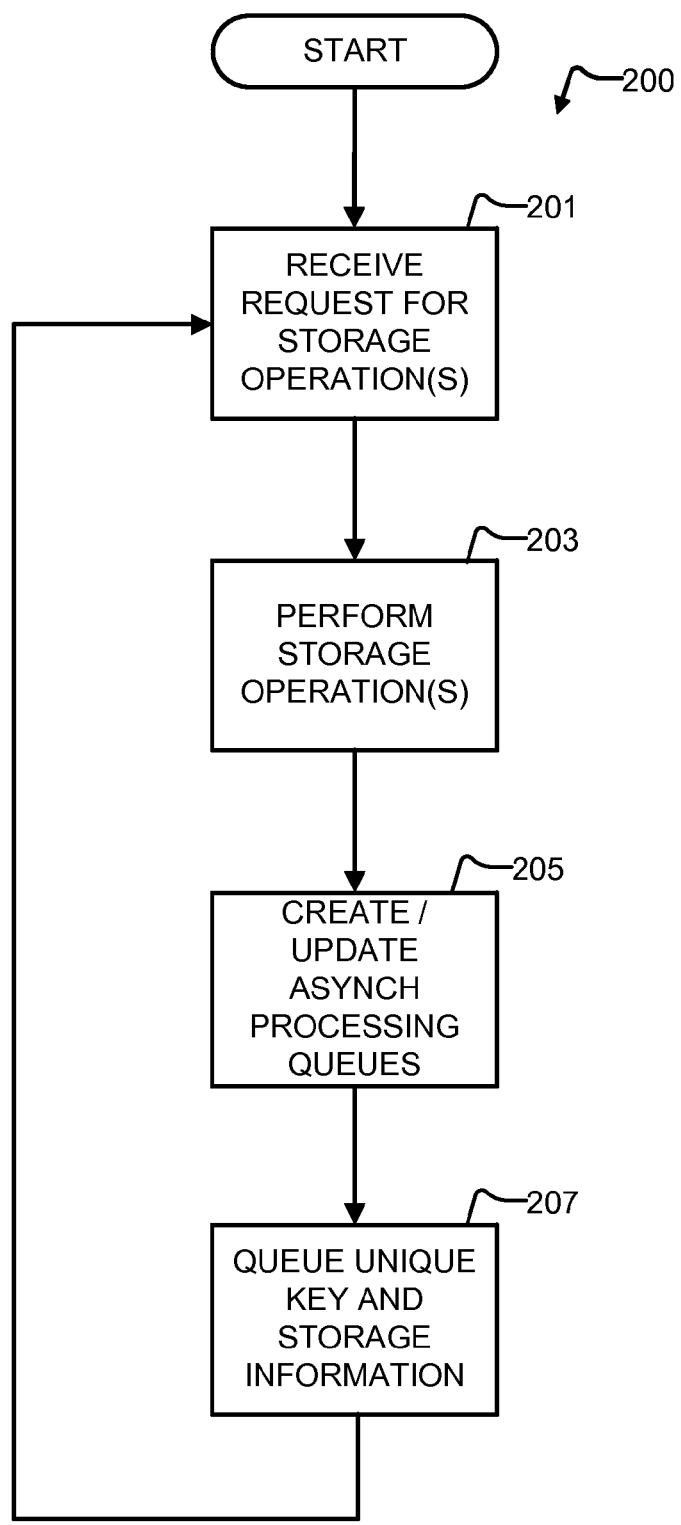
FIG. 2A is a flow diagram illustrating aspects of the operation of an asynchronous processing service that is configured for integration with a computing system for asynchronously processing mapping information, according to one configuration disclosed herein.
Figure 2B:
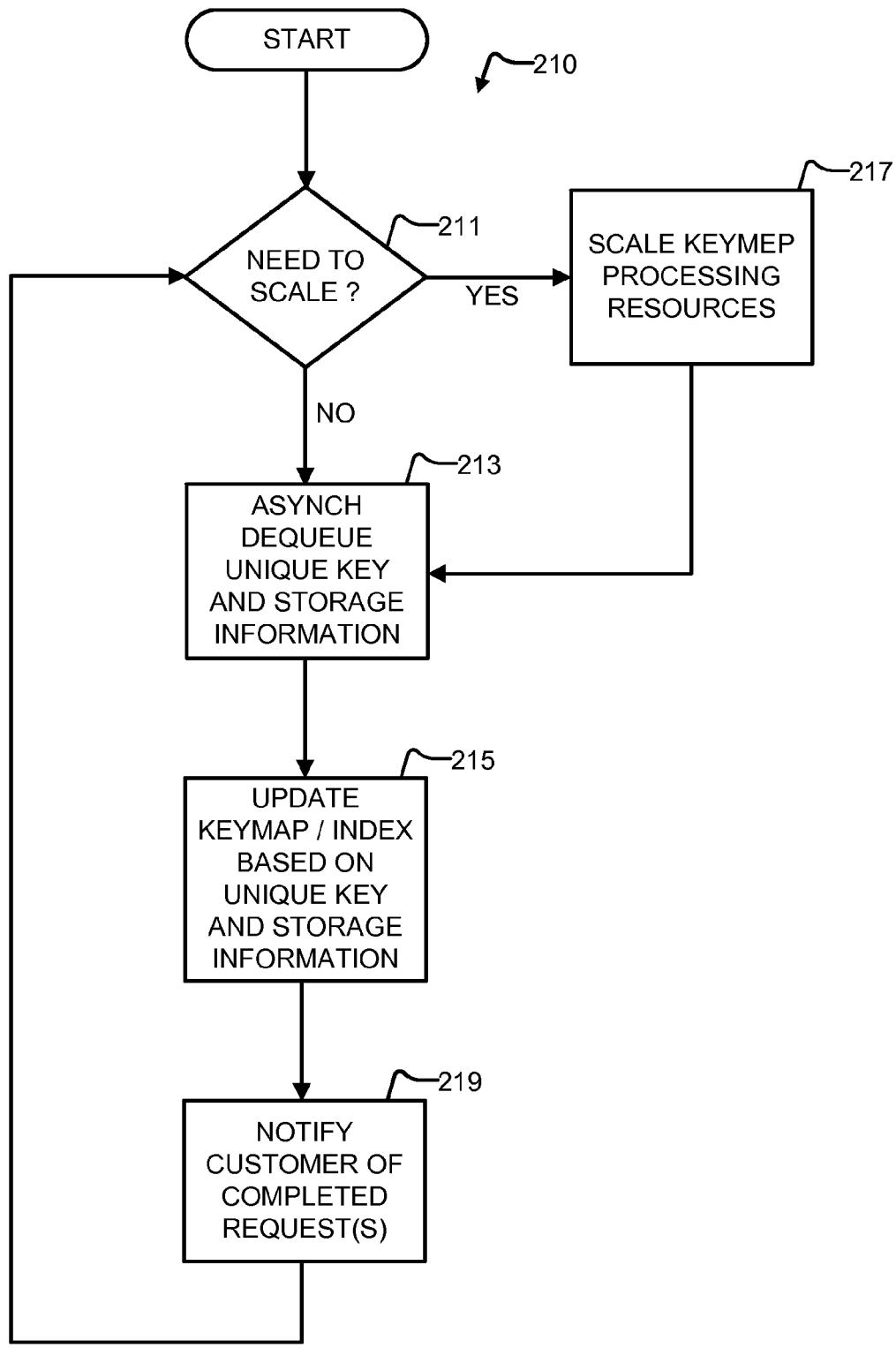
FIG. 2B is a flow diagram illustrating aspects of the operation of the asynchronous processing service that is configured for integration with a computing system for asynchronously processing mapping information, according to one configuration disclosed herein.

FIG. 2A is a flow diagram showing a method 200 illustrating aspects of the operation of the asynchronous processing service 114, and FIG. 2B is a flow diagram showing a method 210 illustrating aspects of the operation of the asynchronous processing service 113, according to one configuration. As shown in FIG. 2A, the method 200 includes receiving a storage request 122 for one or more storage operations, at block 201. The storage request 122 can include a storage object 104, a unique key for the storage object 104, and a description of a storage operation. Storage operations can include put requests, copy requests, delete requests, get requests, and other storage-related operations. Accordingly, if a storage request includes a copy request, delete request, and/or get request, the storage object 104 may not actually be included in the request 122, but instead a description of the storage object 104, the unique key, and/or other identifying information may be included.

Responsive to receipt of the storage request 122, the on-demand data processing component 102 can direct the persistent storage 105 to perform the storage operation or operations described by the storage request 122, at block 203. Thereafter, the asynchronous processing service 114 can create, update, or otherwise manipulate asynchronous processing queues 116, at block 205. Thereafter, the asynchronous processing service 114 queues the unique key and storage information 112, into one or more asynchronous processing queues 116, at block 207.

As described above, the asynchronous processing queues 116 allow for mapping information contained in keymap/index 108 to be processed asynchronously with regard to the performance of storage operations at block 203. Accordingly, the method 200 may iterate through blocks 201, 203, 205, and 207 independently from processing of the unique keys and storage information 112 queued in asynchronous processing queues 116. The asynchronous updating of mapping information and/or keymap/index 108 is described more fully below with reference to FIG. 2B.

As illustrated in FIG. 2B, the method 210 includes determining if resources should be scaled to allow for faster processing of information queued in the asynchronous processing queues 116. For example, due to the asynchronous and independent functioning provided by the asynchronous processing service 114, resources available to the keymap processing component 110 can be scaled without affecting the processing of storage operations shown in FIG. 2A. Accordingly, if the size, priority, or other attributes of information queued in asynchronous processing queues 116 necessitate or otherwise deem additional resources desirable, these resources can be scaled up at block 217. Furthermore, if additional resources are not necessary or if, for example, lazy processing of the asynchronous processing queues 116 is desirable, resources may be scaled down at block 217.

Alternatively, if no scaling, either up or down, is desirable or necessary, the unique key and storage information 112 may be asynchronously dequeued by the asynchronous processing service 114, at block 213. Thereafter, the keymap/index 108 can be updated by the keymap processing component 110, at block 215. Additionally, the customer 131 submitting the request 122 is notified of the complete request at block 219. The method 210 may continually iterate by dequeuing of all unique key and storage information 112 queued at the asynchronous processing queue(s) 116, and updating the keymap/index 108 to reflect all dequeued unique key and storage information.

It is noted that the method 200 and 210 may function independently, and accordingly, provide asynchronous processing of mapping information. Furthermore, although illustrated as being initially populated at block 207, the asynchronous processing queue(s) 116 may already have queued therein several other unique keys and related storage information prior to the queuing functions described with reference to block 207. It should be understood that these prior queued requests may all be processed asynchronously as compared to related storage operations performed by the persistent storage 105 and/or on-demand data processing component 102.

Thus, as described above, the asynchronous processing service 114 may enable asynchronous processing of unique key and storage information 112 received from the on-demand data processing component 102. However, other functionality may also be realized through intelligent operation by the on-demand data processing component 102. For example, some storage requests 122 may include asynchronous processing of the keymap/index 108 while others may include generally synchronous processing of keymap/index 108, depending upon information contained in the storage request 122 and/or other factors. Furthermore, some storage requests 122 may be requests during a high volume of transactions or high number of TPS. This is described more fully below with reference to FIG. 3 and FIG. 4.

Figure 3:
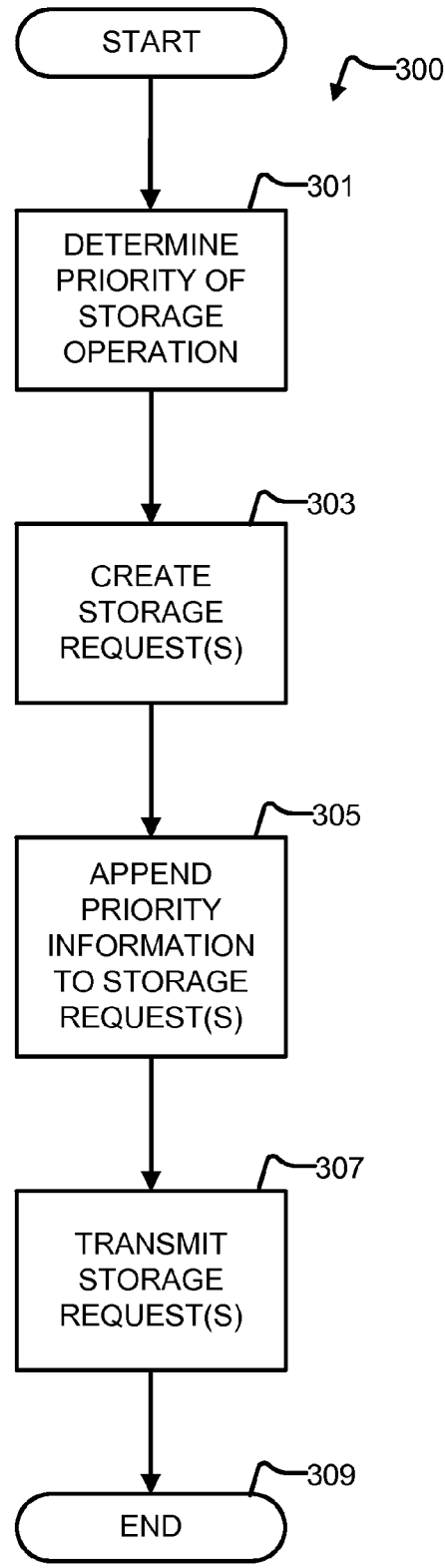
FIG. 3 is a flow diagram illustrating aspects of the operation of a customer computing system in one configuration described herein for asynchronously processing mapping information.

FIG. 3 is a flow diagram showing a method 300 illustrating aspects of the operation of a customer computing system 132, according to one configuration. As shown in FIG. 3, the method 300 includes determining a priority of a storage operation for a storage request 122, at block 301. The customer computing system 132, the customer 131, and/or any computer-executable code being processed by the customer computing system 132 may analyze particular storage operations to determine a priority or necessary time to completion. For example, if a particular set of storage objects 104 have a need to be accessed from the service provider network 120 relatively quickly after storage, these storage objects 104 may be of a high priority. However, if the particular set of storage objects 104 do not need to be accessed relatively quickly after storage, for example if these storage objects are part of an archive, these storage objects 104 may be of a low priority. It should be understood that many different levels of priority might be established for one or more storage objects 104 or sets thereof.

Upon determination of the priority information at block 301, the customer computing system 132 may create the storage requests 122 including the storage object or objects 104 at block 303, and may append the priority information to the storage requests 122, at block 305. According to one configuration, the priority information can include a header value or flag indicating that mapping information for the storage request 122 should be processed asynchronously. According to other configurations, the priority information can include a value or set of values for an appropriate delay in the processing of the mapping information for the storage request 122.

The priority information, header value, and/or flag can be arranged in any suitable manner. For example, if the storage request 122 is formatted to include a header, the header can include "async: true" to indicate mapping information for the storage request 122 should be processed asynchronously or "async: false" to indicate mapping information for the storage request 122 should be processed as soon as possible. As an additional example, a header can include "async_time: <time delay value>" to indicate an appropriate time delay that is acceptable for asynchronous processing of the mapping information of the storage request 122.

Other header information, finer granularity of priority information, and/or any other suitable information may also be appropriate, according to any particular implementation. Furthermore, any suitable communication protocol can be used to create storage requests 122, and therefore it should be understood that protocols such as representational state transfer (REST), Hypertext Transfer Protocol (HTTP), or others, might be applicable. Therefore, the particular examples disclosed herein should not be construed as limiting of all possible implementations. Upon appending of any appropriate priority information at block 305, the storage request(s) 122 are transmitted to the service provider network 120 at block 307, and the method 300 may cease at block 309. Hereinafter, processing of storage requests 122, including storage requests having header information, determination of high TPS, and/or other priority or asynchronous indications are described more fully with reference to FIG. 4.

Figure 4:
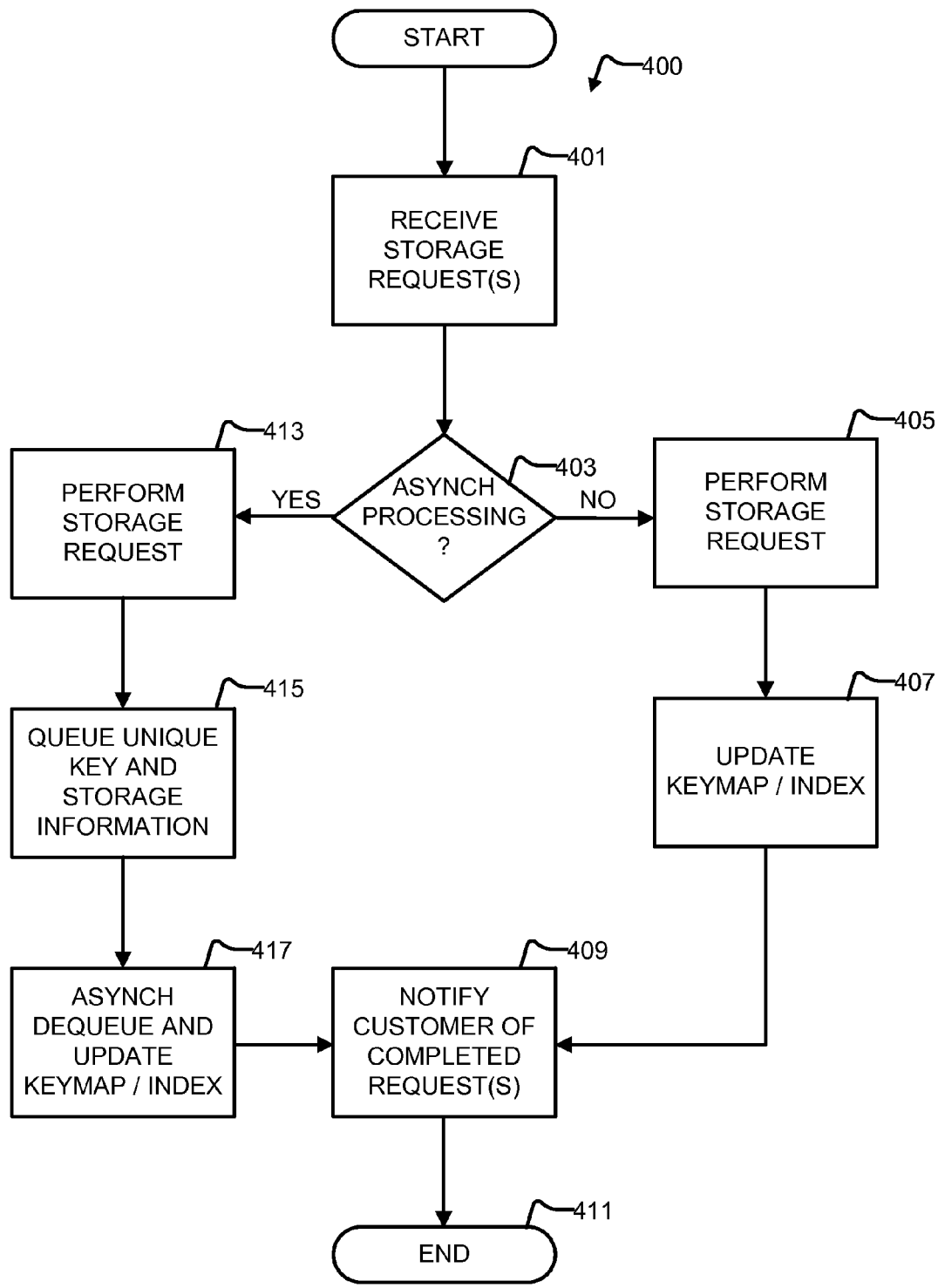
FIG. 4 is a flow diagram illustrating aspects of the operation of the operation of an asynchronous processing service in one configuration described herein.

FIG. 4 is a flow diagram showing a method 400 illustrating aspects of the operation of the asynchronous processing service 114, according to one configuration. As shown in FIG. 4, the method 400 includes receiving one or more storage requests 122, at block 401. The storage requests 122 can be storage requests transmitted at a high or relatively high rate of TPS, and/or can include header information and/or other priority information as described above with reference to FIG. 3. Thereafter, the on-demand data processing component 102 determines if asynchronous processing of mapping information is appropriate, desirable, requested, and/or necessary, at block 403. For example, if a relatively low or steady rate of TPS is occurring, or if there is no indication of asynchronous processing of mapping information in the storage request 122, the on-demand data processing component 102 may direct the persistent storage 105 to perform the storage request 122, at block 405. Thereafter, the keymap processing component 110 updates the keymap/index 108 upon receipt of appropriate unique keys and storage information 112. Thereafter, the customer 131 submitting the request 122 is notified of the complete request at block 409.

Alternatively, if the on-demand data processing component 102 determines that asynchronous processing of mapping information is indicated or otherwise appropriate, the on-demand data processing component 102 directs the persistent storage 105 to perform the storage request 122, at block 413. For example, a relatively high rate of TPS may trigger a need or desire for asynchronous processing at block 403. A relatively high rate of TPS may be determined by comparing a current rate of TPS to a threshold value. More than one threshold value comparison could be implemented if utilizing more than one asynchronous queue 116. Additionally, a header value or flag may trigger a need or desire for asynchronous processing at block 403. Accordingly, depending upon the particular information contained within the storage request 122, as well as a rate of TPS, the on-demand processing component 102 can determine whether to process the request asynchronously. Thereafter, the asynchronous processing service 114 queues the unique key and storage information in one or more asynchronous processing queues 116, at block 415.

As described above, the indication of asynchronous processing can include a priority indication of high/low, a time delay indication, and/or other information including a rate of TPS. Accordingly, depending upon the particular priority, the queuing of the unique key and storage information 112 can be based on the particular priority. For example, the asynchronous processing queues 116 can include a high priority queue and a low priority queue. Thus, high priority asynchronous storage requests can have associated unique key and storage information 112 queued into the high priority queue. Similarly, low priority asynchronous storage requests can have associated unique key and storage information 112 queued into the low priority queue. Thereafter, the asynchronous processing service 114 can dequeue the high priority queue at a higher rate than the low priority queue at block 416, and therefore the keymap/index 108 is updated according to the dequeuing order (e.g., that follows the associated priority).

Additionally, according to one configuration, the asynchronous processing queues 116 can be organized according to a time delay for processing of mapping information. The organizing can be based on a grouping of time delays, such as a one hour delay, a one day delay, a one week delay, or other delays. Thus, asynchronous storage requests 122 indicating a particular acceptable delay are queued into an associated asynchronous processing queue, and the time delay of the queue is enforced through the asynchronous processing service 114. In this manner, asynchronous processing of mapping information indicating a particular delay is processed within the particular delay period indicated in the associated storage request 122.

Additionally, the asynchronous processing queues 116 can be configured to be queued with unique keys and storage information 112 based on a current rate of TPS. For example, if a threshold rate of TPS is exceeded, the unique keys and storage information can be processed asynchronously. Additionally, more than one threshold can be implemented. Thus, if a first threshold and a second threshold are exceeded, an additional asynchronous queue 116 with a different processing priority can be initiated. More or fewer threshold are also applicable, and therefore these particular examples should not be construed as limiting.

Other forms of prioritization and determinations of asynchronous processing are also applicable according to any desired implementation of the functionality described herein. Accordingly, although particular examples of thresholds for rates of TPS, high/low priority queues, and/or time delay-based queues have been described, it should be understood that modification to include more or fewer priorities, different granularity of time delays, and/or other similar attributes are considered within the scope of this disclosure. Hereinafter, different hardware configurations and operating environments capable of implementing one or more features described above are described in more detail.

Figure 5:
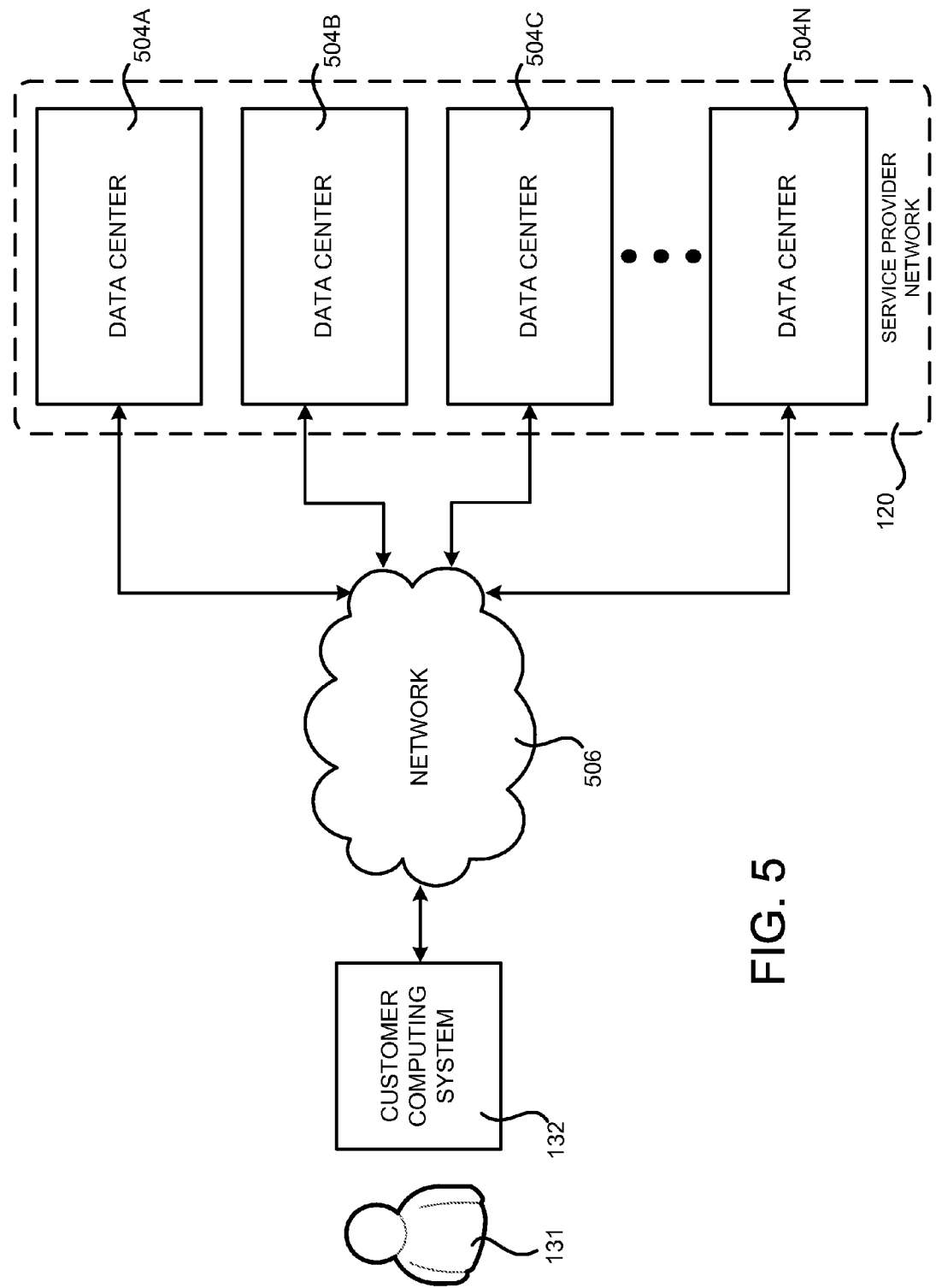
FIG. 5 is a system and network diagram that shows an illustrative operating environment for the various technologies disclosed herein that includes a service provider network that may be configured to implement aspects of the functionality described herein.

FIG. 5 is a system and network diagram that shows one illustrative operating environment for the configurations disclosed herein that includes a service provider network 120 that may be configured to provide an asynchronous processing service 114 in the manner described above, according to one configuration disclosed herein. As discussed briefly above, the service provider network 120 can provide computing resources, such as resources for processing of the keymap/index 108, implementation of the persistent storage 105, or other resources.

The computing resources provided by the service provider network 120 may include various types of computing resources, such as data processing resources, data storage resources, networking resources, data communication resources, and the like. Each type of computing resource may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, and other types of applications. Data storage resources may include file storage devices, block storage devices, and the like. The service provider network 120 might also be configured to provide various network services.

The computing resources provided by the service provider network 120 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for integrating an asynchronous processing service 114 within the service provider network 120 will be described below with regard to FIG. 7.

The customers and other users of the service provider network 120 may access the computing resources provided by the service provider network 120 over a network 506, such as a wide area network (WAN). For example, and without limitation, a customer computing system 132 might be utilized to access the service provider network 120 by way of the network 506. It should be appreciated that a local-area network (LAN), the Internet, or any other networking topology known in the art that connects the data centers 504 to remote customers 131 and other users may be utilized. It should also be appreciated that combinations of such networks might also be utilized.

Figure 6:
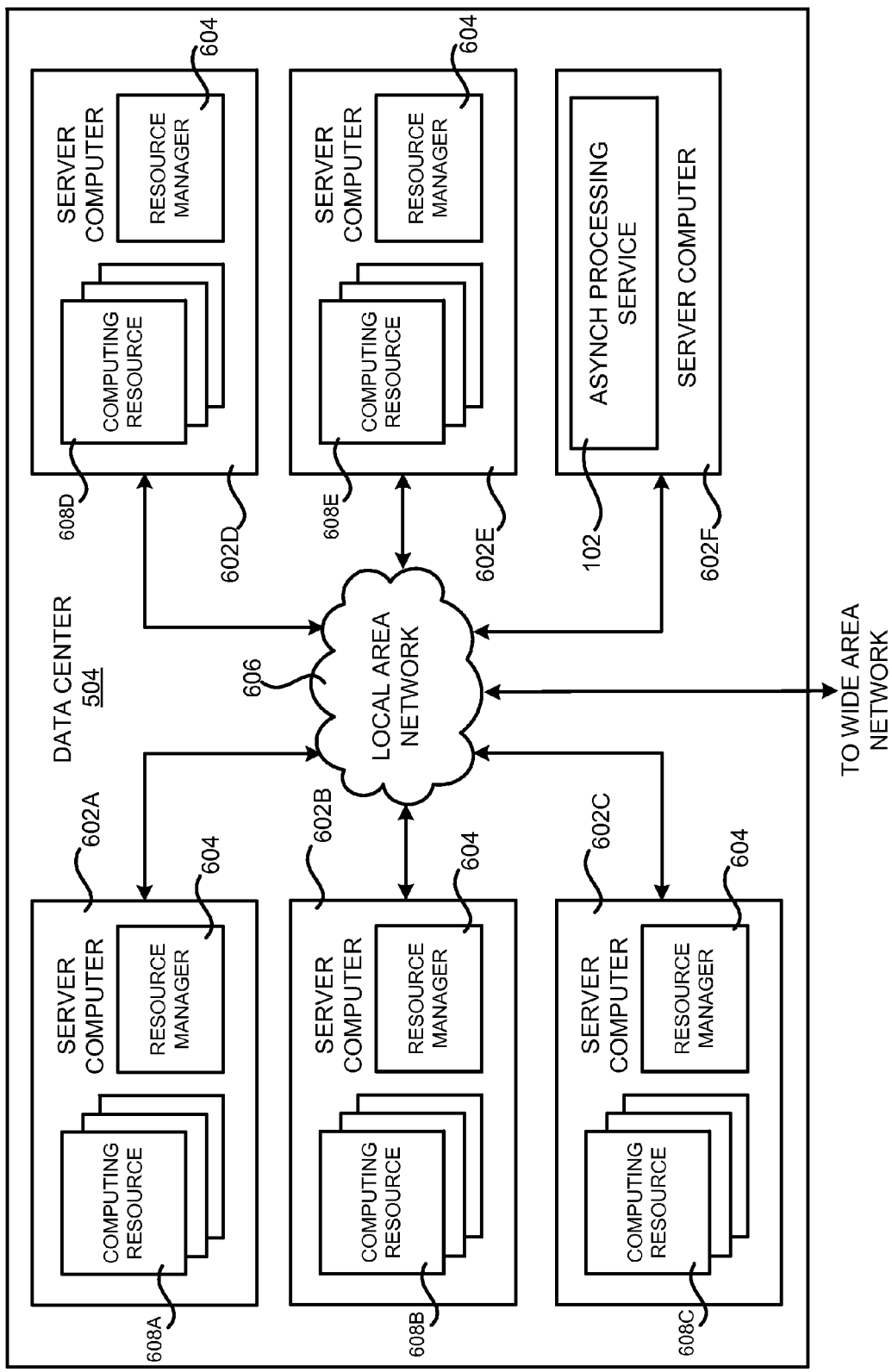
FIG. 6 is a computing system diagram that illustrates a configuration for a data center that may be utilized to implement aspects of the concepts and technologies disclosed herein.

FIG. 6 is a computing system diagram that illustrates one configuration for a data center 504 that implements aspects of the concepts and technologies disclosed herein for implementing an asynchronous processing service 114, according to one configuration disclosed herein. The example data center 504 shown in FIG. 6 includes several server computers 602A-602F (which may be referred to herein singularly as "a server computer 602" or in the plural as "the server computers 602") for providing computing resources 608A-608E.

The server computers 602 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 602 might also be configured to execute a resource manager 604 capable of instantiating and/or managing the computing resources. In the case of data storage services, for example, the resource manager 604 might be a program configured to enable the execution of the bucket-based storage model on computing resources 608, for example. Server computers 602 in the data center 504 might also be configured to provide network services and other types of services, some of which are described in detail below with regard to FIG. 7.

The data center 504 shown in FIG. 6 also includes a server computer 602F that may be utilized for executing some or all of the software components described above. For example, and without limitation, the server computer 602F might be configured to execute the asynchronous processing service 114, which has been described in detail above. The server computer 602F might also be configured to execute other components and/or store data for providing some or all of the functionality described herein, including the on-demand data processing component 102, keymap processing component 110, keymap index 108, and/or persistent storage 105.

In the example data center 504 shown in FIG. 6, an appropriate LAN 606 is utilized to interconnect the server computers 602A-602F. The LAN 606 is also connected to the network 506 illustrated in FIG. 5. It should be appreciated that the configuration and network topology illustrated in FIGS. 1-6 has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 504A-504N, between each of the server computers 602A-602F in each data center 504, and, potentially, between computing resources in each of the data centers 504. It should be appreciated that the configuration of the data center 504 described with respect to FIG. 6 is merely illustrative and that other implementations might be utilized.

Figure 7:
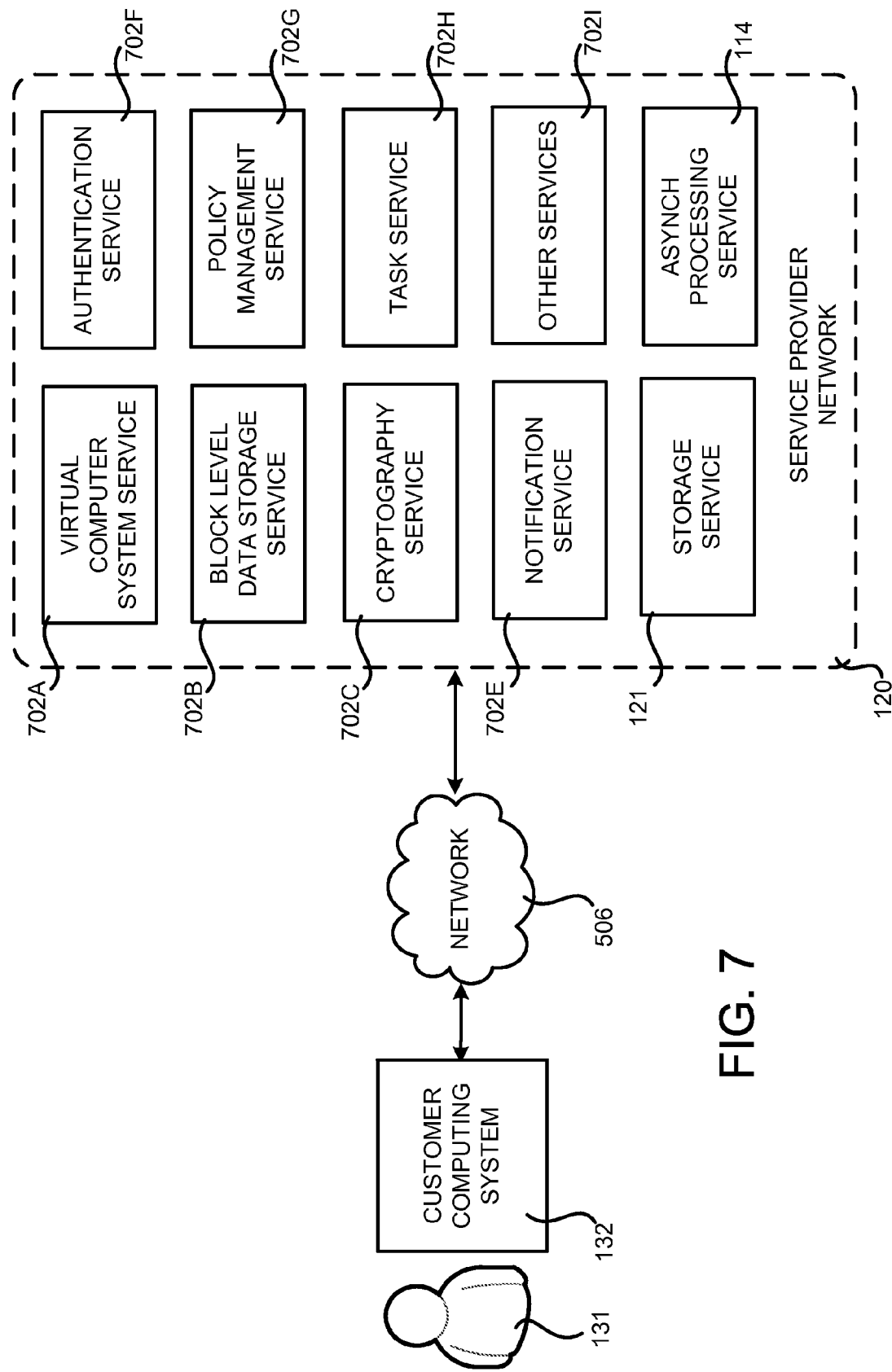
FIG. 7 is a system and network diagram that shows aspects of several services that might be provided by and utilized within a service provider network in one configuration disclosed herein.

FIG. 7 is a system and network diagram that shows aspects of several services 702 that might be provided by and utilized within a service provider network 120 in one configuration disclosed herein. In particular, FIG. 7 shows an example of a customer computing system 132 connected to the service provider network 120 through a network 506 in one example. As discussed briefly above, the service provider network 120 may provide a variety of services 702 to customers of the service provider network 120, including but not limited to, the asynchronous processing service 114.

It should be appreciated that customers 131 of the service provider network 120 may be an organization that may utilize the services provided by the service provider network 120. Additionally, customers of the service provider network 120 may be individuals that utilize the services provided by the service provider network 120. As shown in FIG. 7, a customer 131 may communicate with the service provider network 120 through a network 506, which may be a communication network, such as the Internet, an intranet or an Internet service provider (ISP) network. Communications from the customer computing system 132 to the service provider network 120 may cause the services provided by the service provider network 120 to operate in accordance with configurations described or variations thereof.

As discussed briefly above, the service provider network 120 may provide various types of network services to its customers 131. The services provided by the service provider network 120, in this example, include a virtual computer system service 702A, a block-level data storage service 702B, a cryptography service 702C, a notification service 702E, an authentication service 702F, a policy management service 702G, a task service 702H and, potentially, other services 702I. The service provider network 120 may also provide the storage service 121 and asynchronous processing service 114 for use internally and by external customers. Additionally, although not particularly illustrated, it should be understood that the on-demand data processing component 102 could be configured in combination with the keymap processing component 110 and/or asynchronous processing service 114, as a single identifiable service, or could be otherwise abstracted as one or more of the services 702.

It is noted that not all configurations described include the services 702A-702I described with reference to FIG. 7 and additional services may be provided in addition to or as an alternative to services explicitly described. Each of the services 702A-702I may include web service interfaces that enable a caller to submit appropriately configured API calls to the various services through web service requests. In addition, each of the services may include service interfaces that enable the services to access each other (e.g., to enable a virtual computer system of the virtual computer system service 702A, to store data in or retrieve data from the on-demand data storage service 702D, and/or to access block-level data storage devices provided by the block level data storage service 702B). Additional details regarding the services 702A-702H shown in FIG. 7 will now be provided.

The virtual computer system service 702A may be a collection of computing resources configured to instantiate virtual machine instances. For example, a customer 131 of the service provider network 120 may interact with the virtual computer system service 702A (via appropriately configured and authenticated API calls) to provision and operate virtual computer systems that are instantiated on physical computing devices hosted and operated by the service provider network 120. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the virtual computer system service 702A is shown in FIG. 7, any other computer system or computer system service may be utilized in the service provider network 120, such as a computer system or computer system service that does not employ virtualization or instantiation and instead provisions computing resources on dedicated or shared computers/servers and/or other physical devices.

The block-level data storage service 702B may comprise computing resources that collectively operate to store data using block-level storage devices (and/or virtualizations thereof). The block-level storage devices of the block-level data storage service 702B may, for instance, be operationally attached to virtual computer systems provided by the virtual computer system service 702A to serve as logical units (e.g., virtual drives) for the computer systems. A block-level storage device may enable the persistent storage of data used/generated by a corresponding virtual computer system where the virtual computer system service 702A may only provide ephemeral data storage.

The service provider network 120 may also include a cryptography service 702C. The cryptography service 702C may utilize storage services of the service provider network 120 to store encryption keys in encrypted form, whereby the keys may be usable to decrypt customer keys accessible only to particular devices of the cryptography service 702C. The cryptography service 702C might also provide other types of functionality not specifically mentioned herein.

The service provider network 120 might also provide a notification service 702E in some configurations. The notification service 702E may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., HTTP, e-mail and short message service (SMS), among others). The notification service 702E may provide notifications to clients using a "push" mechanism without the need to periodically check or "poll" for new information and updates. The notification service 702E may further be used for various purposes such as monitoring applications executing in the virtual computer system service 702A, workflow systems, time-sensitive information updates, mobile applications, and many others.

As illustrated in FIG. 7, the service provider network 120, in various configurations, includes an authentication service 702F and a policy management service 702G. The authentication service 702F, in one example, is a computer system (i.e., collection of computing resources) configured to perform operations involved in authentication of users of the customer. For instance, one of the services 702A-702E and 702G-702I may provide information from a user to the authentication service 702F to receive information in return that indicates whether or not the requests submitted by the user are authentic.

The policy management service 702G, in one example, is a computer system configured to manage policies on behalf of customers or internal users of the service provider network 120. The policy management service 702G may include an interface that enables customers to submit requests related to the management of policy. Such requests may, for instance, be requests to add, delete, change or otherwise modify policy for a customer or for other administrative actions, such as providing an inventory of existing policies and the like.

The service provider network 120, in various configurations, is also configured with a task service 702H. The task service 702H is configured to receive a task package and to enable executing tasks as dictated by the task package. The task service 702H may be configured to use any resource of the service provider network 120, such as instantiated virtual machines or virtual hosts, for executing the task. The task service 702H may configure the instantiated virtual machines or virtual hosts to operate using a selected operating system and/or a selected execution application in accordance with specified requirements.

The service provider network 120 may additionally maintain other services 702I based, at least in part, on the needs of its customers. For instance, the service provider network 120 may maintain a database service is some configurations. A database service may be a collection of computing resources that collectively operate to create, maintain, and allow queries to be performed on databases stored within the service provider network 120. For example, a customer of the service provider network 120 may operate and manage a database from the database service by utilizing appropriately configured API calls. This, in turn, may allow the customer to maintain and potentially scale the operations in the database. Other services include object-level archival data storage services, services that manage and/or monitor other services. The service provider network 120 might also be configured with other services not specifically mentioned herein.

Figure 8:
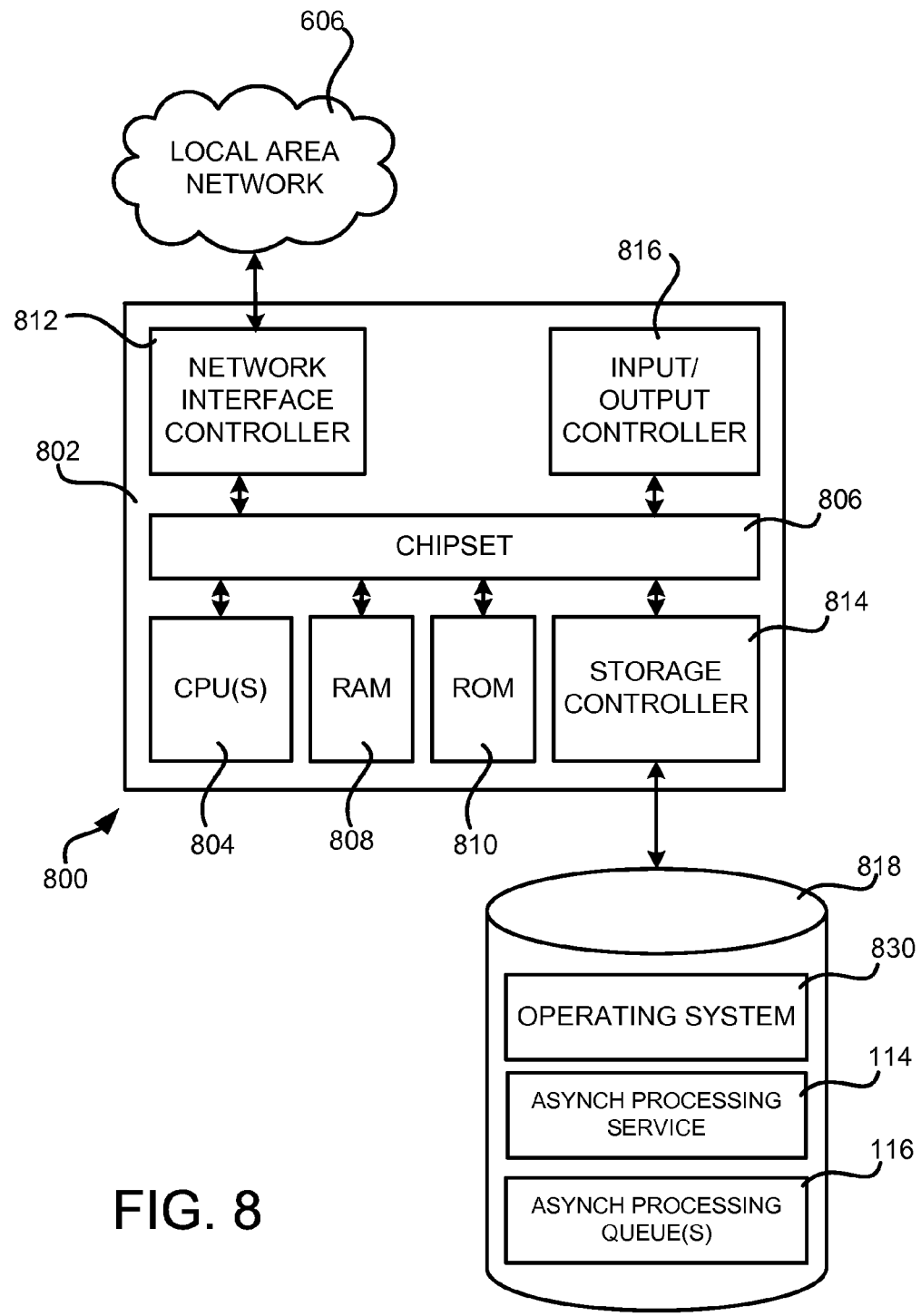
FIG. 8 is a computer architecture diagram showing an illustrative computer hardware architecture for implementing a computing device that might be utilized to implement aspects of the various technologies presented herein.

FIG. 8 shows an example computer architecture for a computer 800 capable of executing program components for implementing the asynchronous processing service 114 and other components in the manner described above. The computer architecture shown in FIG. 8 illustrates a conventional server computer, workstation, desktop computer, laptop, tablet, network appliance, e-reader, smartphone, or other computing device, and may be utilized to execute any of the software components presented herein. For example, the computer architecture shown in FIG. 8 may be utilized to execute software components for providing the asynchronous processing service 114 and/or related functionality. The computer architecture shown in FIG. 8 might also be utilized to implement a customer computing system 132 or any other of the computing systems described herein.

The computer 800 includes a baseboard 802, or "motherboard," which is a printed circuit board to which a multitude of components or devices may be connected by way of a system bus or other electrical communication paths. In one illustrative configuration, one or more central processing units (CPUs) 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM may also store other software components necessary for the operation of the computer 800 in accordance with the configurations described herein.

The computer 800 may operate in a networked environment using logical connections to remote computing devices and computer systems through a network, such as the local area network 606. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 818 may store other system or application programs and data utilized by the computer 800, such as the storage service 121, asynchronous processing service 114, the on-demand data processing component 102, the keymap processing component 110, and/or any of the other software components and data described above. The mass storage device 818 might also store other programs and data not specifically identified herein.

In one configuration, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to one configuration, the computer 800 has access to computer-readable storage media storing computer-executable instructions which, when executed by the computer 800, perform the various routines described above with regard to FIGS. 2, 3, and 4. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for providing asynchronous processing of mapping information have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method of asynchronously processing mapping information for storage objects stored in persistent storage, the method comprising:
    receiving a storage request including identification of a storage object and a description of a storage operation, the storage operation being an operation to be performed for the storage object;
    performing the storage operation for the storage object in response to receiving the storage request;
    generating a unique identification information describing the storage object and information describing the performed storage operation;
    queuing the unique identification information and the information describing the performed storage operation in an asynchronous processing queue;
    dequeuing the unique identification information and the information describing the performed storage operation asynchronously as compared to the performing the storage operation; and
    updating the mapping information with the dequeued unique identification information and the information describing the performed storage operation.

2. The computer-implemented method of claim 1, wherein performing the storage operation comprises:

storing the storage object in a persistent storage in a synchronous manner upon receipt of the storage request, and wherein the persistent storage is a bucket-based storage system in which the storage object is grouped into an associated storage bucket.

3. The computer-implemented method of claim 2, wherein generating the unique identification information comprises:
determining locator information describing a location of the storage object in the persistent storage.

4. The computer-implemented method of claim 1, wherein the asynchronous processing queue is a data structure having a first-in-first-out ordering of queued information.

5. The computer-implemented method of claim 1, wherein the mapping information comprises a dynamic data structure having stored therein a sorted ordering of unique keys and locator values corresponding to storage objects stored in the persistent storage.

6. An apparatus for asynchronously processing mapping information in a keymap for storage objects stored in persistent storage, the apparatus configured to:
receive unique identification information describing a storage object and information describing a storage operation to be performed for the storage object;
queue the unique identification information and the information describing the storage operation in an asynchronous processing queue;
asynchronously dequeue the unique identification information and the information describing the storage operation; and
request an update of the keymap in response to the asynchronous dequeuing.

7. The apparatus of claim 6, wherein the apparatus is further configured to:
determine that a threshold rate of storage requests has been met or exceeded; and
in response to determining that the threshold rate of storage requests has been met or exceeded, queue the unique identification information and the information describing the storage operation in the asynchronous processing queue.

8. The apparatus of claim 6, wherein the asynchronous processing queue comprises a first-in-first-out queue functioning independent of the storage operation performed for the storage object.

9. The apparatus of claim 6, wherein the keymap comprises a sorted ordering of unique keys and locator values corresponding to storage objects stored in the service provider network.

10. The apparatus of claim 6, wherein the apparatus is further configured to
receive a storage request describing the storage object and the storage operation; and
perform the storage operation for the storage object in response to receiving the storage request.

11. The apparatus of claim 10, wherein the apparatus is further configured to store the storage object in the persistent storage in a synchronous manner upon receipt of the storage request, and wherein the persistent storage is a bucket-based storage system.

12. The apparatus of claim 10, wherein the apparatus is further configured to generate the unique identification information in response to performing the storage operation.

13. The apparatus of claim 10, wherein asynchronously dequeuing the unique identification information and the information describing the storage operation comprises dequeuing the unique identification information and the information describing the storage operation independent from performing the storage operation for the storage object.

14. A non-transitory computer-readable storage medium having computer-executable instructions stored thereupon which, when executed by a computer, cause the computer to:
receive a storage request including identification of a storage object and a description of a storage operation;
perform the storage operation for the storage object in response to receiving the storage request;
generate unique identification information describing the storage object and information describing the performed storage operation;
queue the unique identification information and the information describing the performed storage operation in an asynchronous processing queue;
dequeue the unique identification information and the information describing the performed storage operation; and
asynchronously update mapping information for the performed storage operation with the unique identification information and the information describing the performed storage operation.

15. The non-transitory computer-readable storage medium of claim 14, wherein asynchronously updating the mapping information comprises resorting mapping information for a bucket-based storage system independent from performing the storage operation.

16. The non-transitory computer-readable storage medium of claim 14, wherein asynchronously updating the mapping information comprises dequeuing the unique identification information describing the storage object independent from performing the storage operation.

17. The non-transitory computer-readable storage medium of claim 14, wherein the storage request further includes priority information related to processing of the mapping information.

18. The non-transitory computer-readable storage medium of claim 17, wherein the information describing the storage object and the information describing the storage operation are asynchronously dequeued.

19. The non-transitory computer-readable storage medium of claim 14, wherein performing the storage operation comprises:
storing the storage object in a persistent storage upon receipt of the storage request, wherein the persistent storage is a bucket-based storage system in which the storage object is grouped into an associated storage bucket.

20. The non-transitory computer-readable storage medium of claim 14, further comprising computer-executable instructions which, when executed by the computer, cause the computer to send notification of successful updating of the mapping information.

* * * * *